UNITED STATES PATENT OFFICE.

HUGH RODMAN, OF PITTSBURG, PENNSYLVANIA.

CEMENTING MATERIAL AND METHOD OF MAKING THE SAME.

949,442.

Specification of Letters Patent. Patented Feb. 15, 1910.

No Drawing. Application filed April 3, 1908. Serial No. 424,893.

*To all whom it may concern:*

Be it known that I, HUGH RODMAN, a citizen of the United States, and a resident of Pittsburg, in the county of Allegheny and State of Pennsylvania, have made a new and useful Invention in Cementing Material and Methods of Making the Same, of which the following is a specification.

This invention relates to cementing or case hardening material.

In a co-pending application for Letters Patent Serial No. 496,271 filed by me on or about May 15, 1909 I have disclosed a cementing or case hardening material composed of coke, and an energizing substance as for example lime and soda-ash, properly ground or powdered and mixed in proper proportions. By energizing substance, I mean such material, not necessarily carbonaceous material, as will when added to an inactive carbonaceous substance, render such carbonaceous substance active, as a carbonizing agent. The lime of such a mixture tends to carbonate upon exposure to the air and the soda-ash to dissolve if the mixture becomes wet. I have discovered that such material may be protected so that the lime constituent thereof will not carbonate nor the soda-ash dissolve by coating the material with a substance such as oil or a solid hydrocarbon such as asphaltum.

In order to properly coat the material, it is preferably heated in a vessel to somewhat above the boiling point of water and to this is added about ten per cent. by weight of oil or asphaltum while the mass is being stirred. The result is a carbonaceous particle coated with a hydrocarbon covering in which is embedded the energizing substance, as lime and soda ash. The material in this manner may be thoroughly coated so that it will not be liable to atmospheric deterioration nor will it deteriorate if it becomes wet. I also find that by coating the material in this manner the proper proportions of the separate constituents of the material will remain throughout the mass for an indefinite period; owing to the specific gravities of the several constituents when the material is not coated they tend to separate, the heavier and smaller particles settling to the bottom. This coating, therefore, accomplishes the double object of preventing deterioration and maintaining a homogeneous mixture.

Having thus described my invention, what I claim is:

1. The method of preventing deterioration in the cementing or case hardening compounds containing carbonaceous and energizing substances which consists in coating the carbonaceous particles with a protecting substance carrying the energizing substance.

2. The method of preventing deterioration in cementing or case hardening material comprising a mixture of substances of different specific gravities which consists in coating one of the substances with a tacky water proof substance in which is embedded another substance.

3. Cementing material comprising a mixture of several substances of different specific gravities and a tacky water proof substance holding the substances in predetermined proportions.

4. Cementing material consisting of a mixture of carbonaceous material, an energizing substance and a tacky water proof substance, the energizing substance being embedded in the water proof substance.

5. Cementing material consisting of a carbonaceous substance and a hydrocarbon protector containing an energizing substance.

6. Cementing material consisting of a carbonaceous base and a tacky binder containing an energizer.

In testimony whereof, I have hereunto subscribed my name this 1st day of April, 1908.

HUGH RODMAN.

Witnesses:
BIRNEY HINES,
E. M. MCCALLISTER.